United States Patent
Blanchard et al.

[11] Patent Number: 5,906,782
[45] Date of Patent: May 25, 1999

[54] METHOD FOR THE SIMULTANEOUS CURING OF THERMOSETTING RESINS

[75] Inventors: Patrick James Blanchard, Lenton; Christopher Douglas Rudd, West Bridgford, both of United Kingdom

[73] Assignee: Ford Global Technolgies, Inc., Dearborn, Mich.

[21] Appl. No.: 08/505,986

[22] Filed: Jul. 24, 1995

[30] Foreign Application Priority Data

Jul. 23, 1994 [GB] United Kingdom .................... 9415277
May 12, 1995 [EP] European Pat. Off. .............. 95303195

[51] Int. Cl.$^6$ ........................... B29C 31/10; B29C 35/02; B29C 45/02
[52] U.S. Cl. .................... 264/255; 264/328.4; 264/328.5
[58] Field of Search ...................... 264/250, 255, 264/328.4, 328.5, 328.6, 328.13, 328.14; 425/129.1, 543, 544

[56] References Cited

U.S. PATENT DOCUMENTS

| | | | |
|---|---|---|---|
| 2,279,208 | 4/1942 | Shaw ..................................... | 264/328.4 |
| 4,123,488 | 10/1978 | Lawson ..................................... | 264/250 |
| 4,315,724 | 2/1982 | Taoka et al. . | |
| 4,316,869 | 2/1982 | Van Gasse ............................... | 264/255 |
| 4,701,292 | 10/1987 | Valyi . | |
| 4,863,665 | 9/1989 | Schad et al. ........................... | 264/328.4 |
| 4,931,234 | 6/1990 | Schad et al. ........................... | 264/255 |
| 5,059,361 | 10/1991 | Da Re' ..................................... | 264/255 |
| 5,187,001 | 2/1993 | Brew ....................................... | 264/328.4 |
| 5,354,352 | 10/1994 | Nakai et al. ............................. | 264/250 |
| 5,516,271 | 5/1996 | Swenor et al. ........................ | 264/328.4 |

FOREIGN PATENT DOCUMENTS

| | | |
|---|---|---|
| 0106208 A2 | 4/1984 | European Pat. Off. . |
| 1369744 | 10/1974 | United Kingdom . |
| 1513375 | 6/1978 | United Kingdom . |
| 2177968 | 2/1987 | United Kingdom . |

*Primary Examiner*—Angela Ortiz
*Attorney, Agent, or Firm*—Damian Porcari

[57] ABSTRACT

In resin transfer molding, each mold cavity is charged initially with a hot curing resin system, then while the first resin is still uncured, successively injecting one or more resin systems which push the previous systems to the periphery of the mold. Each of said successive resin system curing at a lower temperature then the preceding system. Thus each resin system cures progressively faster than the previously injected resin system such that all resin systems cure at substantially the same point in time.

4 Claims, 3 Drawing Sheets

METHOD FOR THE SIMULTANEOUS CURING OF THERMOSETTING RESINS

BACKGROUND OF THE INVENTION

This invention relates to a method for molding products from thermosetting resins, and in particular to resin transfer molding.

In resin transfer molding, a fibrous reinforcement preform is placed in a mold, the mold is closed and resin is introduced into the mold cavity to wet the preform and to fill the mold. When the resin has set, a finished component can be taken from the mold and passed to any necessary clean up processes.

The choice of the resin system (resin plus catalyst) is carefully chosen to ensure that the resin flows completely to the edges of the mold cavity before it sets, and so that setting takes place as soon as possible after the mold is completely filled.

In order for resin transfer molding to be useful for the production of components in volume, it is necessary to reduce the cycle time, i.e. the time between successive openings of the mold, as far as possible.

SUMMARY OF THE INVENTION

According to the present invention, there is provided a method for molding products from thermosetting resins, and in particular, reducing the cycle time during the volume production of said components. This reduction in cycle time is accomplished by the method of resin transfer molding using a mold having a periphery and an injection gate. A first thermosetting resin system is injected into a mold cavity to partially fill the mold cavity. After the first resin system is injected, but before the first resin system has cured, successively injecting one or more resin systems which causes the previously injected resin systems to flow to the mold periphery. Each resin system curing progressively faster than the previously injected resin system such that all resin systems cure at substantially the same point in time.

The molding method is preferably a resin transfer molding method.

The difference between the resin systems may be due to different types or different concentrations of catalysts and/or accelerators. It is preferred for the resins themselves to be the same in each systems.

In a method using resin systems which set at different temperatures, and in which cold resin is introduced into a heated mold, the first resin introduced will be heated by the stored heat of the mold, and the incoming cold resin will tend to reduce the temperature of the mold at the injection point. By using a cold setting resin to form the part of the component around the injection point, the setting of the resin and therefore the process cycle can be considerably speeded up compared to the case where a hot setting resin is introduced to the mold at the end of the process, in the area of the, now cold, resin injection point.

The change in resin system could be continuous throughout the injection phase, to produce a profiling effect, rather than discrete resin systems.

The invention also provides apparatus for molding products from thermosetting resins, the apparatus comprising a reservoir for uncatalyzed resin, a main conduit extending from the reservoir for connection to a mold, at least two independent reservoirs at least for two different catalysts, means for independently connecting the independent reservoirs to the main conduit, a stirrer for mixing the catalyst and the resin and means for forcing resin to flow through the main conduit into the mold.

A valve will be provided to switch over from one catalyst reservoir to the other, and it is important that there should be no introduction of air or other foreign matter when changeover takes place.

Initiation of changeover can be in response to the elapsing of a period of time after the commencement of resin introduction, or on the sensing of a particular parameter associated with resin introduction, for example the changeover may be initiated when a sensor in the mold detects that the resin front has reached a predetermined position within the mold.

If a continuously changing resin system is being used, more sophisticated equipment would be required, for example to provide a continuously changing catalyst composition to be fed into a resin stream.

BRIEF DESCRIPTION OF THE DRAWINGS

The invention will now be further described, by way of example, with reference to the accompanying drawings, in which.

DESCRIPTION OF THE PREFERRED EMBODIMENTS

Figure 1:
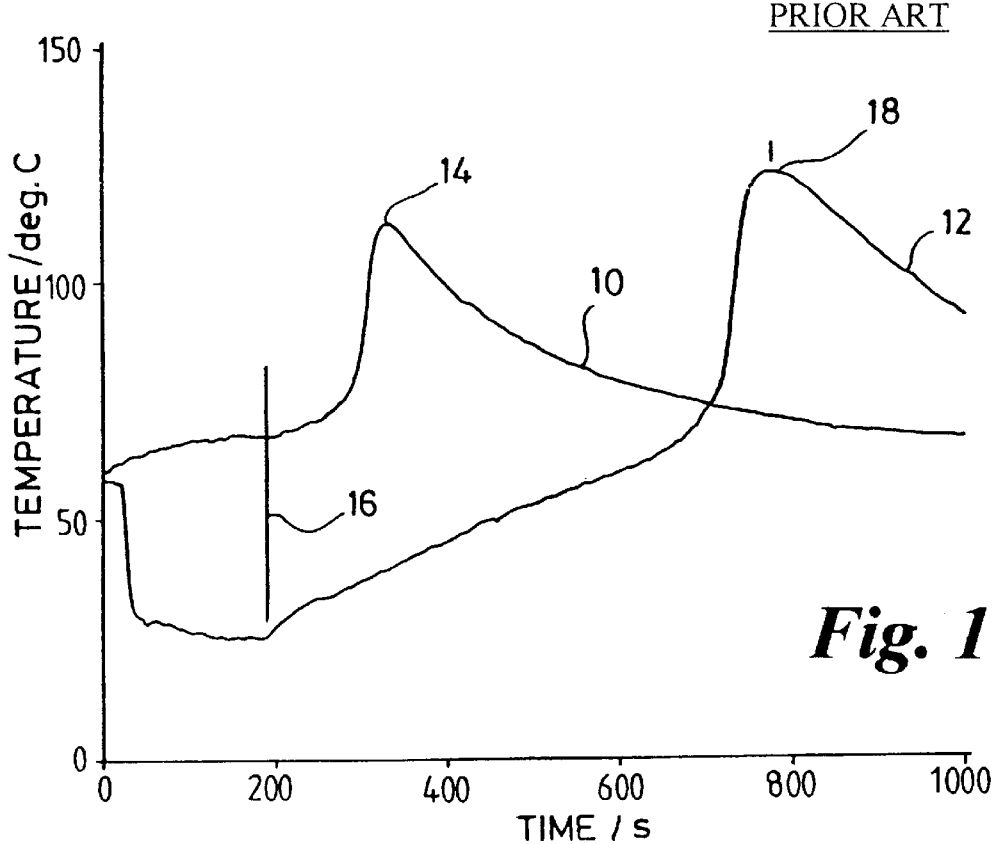
FIG. 1 is a graph showing the thermal history of a resin transfer molding cycle in accordance with the prior art.
Figure 2:
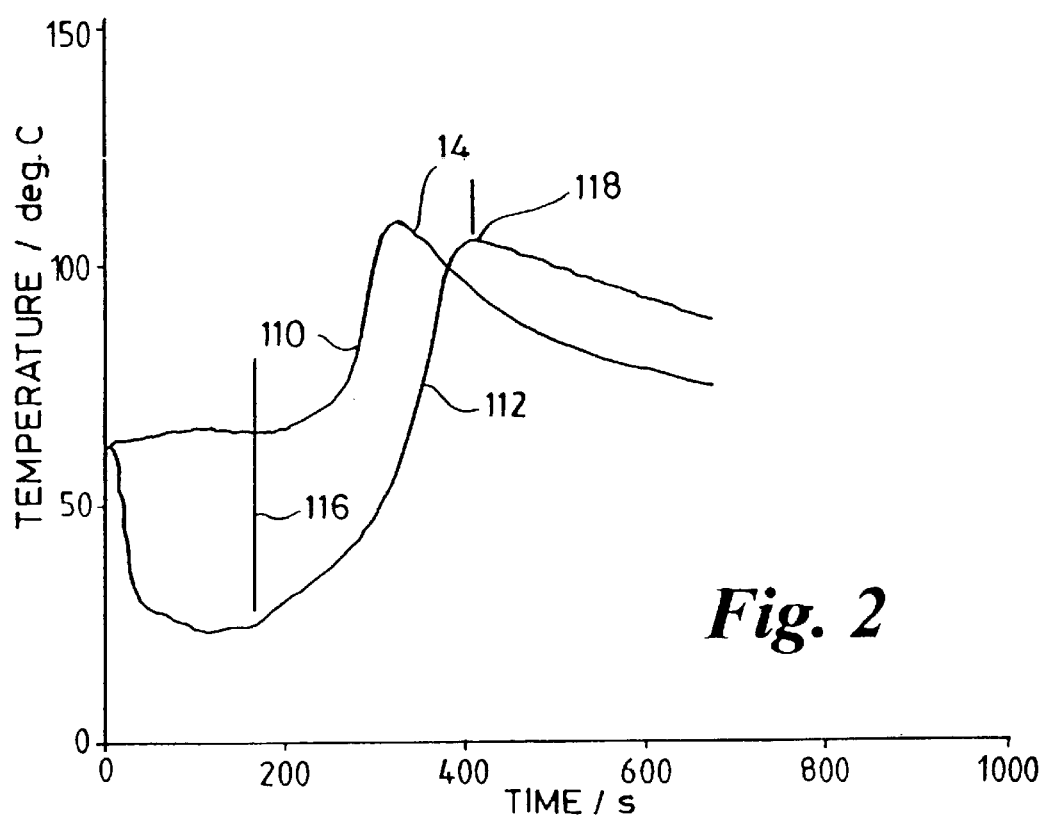
FIG. 2 is a graph corresponding to the graph of FIG. 1 but showing the thermal history of a resin transfer molding cycle in accordance with the present invention.

FIGS. 1 and 2 are grapes on which temperature is plotted against time. The curve 10 represents the thermal history at the periphery of a resin transfer mold, and the curve 12 represents the thermal history at the resin injection gate of the same mold.

In resin transfer molding, the resin is mixed with catalyst before or as it enters the mold cavity. The setting or curing process has therefore already begun (but with a negligible degree of conversion) as the resin begins to flow through the mold, but it is essential that the resin reaches the extremities of the mold cavity before it sets. Normally, the resin will be introduced cold into a heated mold, and the activity of the catalyst and the temperature of the mold will be determined so that the resin is able to flow to the edges of the mold but begins to set as soon as it reaches the mold edges. The actual setting process for the resin is exothermic, so the occurrence of setting can be monitored by watching the temperature using probes in the mold wall. The probes may be mounted flush to the internal surface of the mold cavity or may protrude into the surface of the molded part.

Looking now at the example illustrated in FIG. 1, the mold is initially heated to a temperature of about 60° C. As the cold resin is introduced at the injection gate of the mold, there is little initial change in the temperature at the mold periphery as shown by curve 10. However, the temperature rises sharply to a peak 14 when the resin begins to cure at the mold periphery. The resin is substantially cured and set at the mold periphery after about 350 seconds, and the temperature at the mold periphery thereafter gradually drops back to the original mold temperature.

However, at the injection gate, as shown by the curve 12, the temperature initially drops sharply when the cold resin is introduced. Once injection is completed, after about 200 seconds and as indicted by the line 16, the temperature of the resin at the injection gate begins to rise until it reaches a temperature of about 70° C. at which curing can start. Thereafter the temperature at the injection gate rises to a peak 18 and it is only when this peak is reached that the resin is completely set throughout the mold. In the illustration shown, this results in a cure time for the last portions of the article to cure of about 800 seconds from the start of injection.

Turning now to FIG. 2, it will be seen that the curve 110 representing the thermal history at the mold periphery is effectively unchanged from the curve 10 in FIG. 1, and also the temperature profiles during injection are substantially the same.

The difference however between the two situations is that in FIG. 2, the resin introduced last, i.e. the resin which remains in the vicinity of the injection gate, is a resin which starts to cure at a relatively low temperature. It is therefore not necessary to wait until the stored heat in the mold heats up the resin before cure can begin; instead, cure begins in this case at a low temperature of about 30° C. resulting in the completion of cure at the injection gate after about 400 seconds.

In this example, by using a cold curing catalyst at the end of the mold cycle and a hot curing catalyst at the beginning of the mold cycle, a cycle time reduction of about 50% has been possible.

Figure 3:
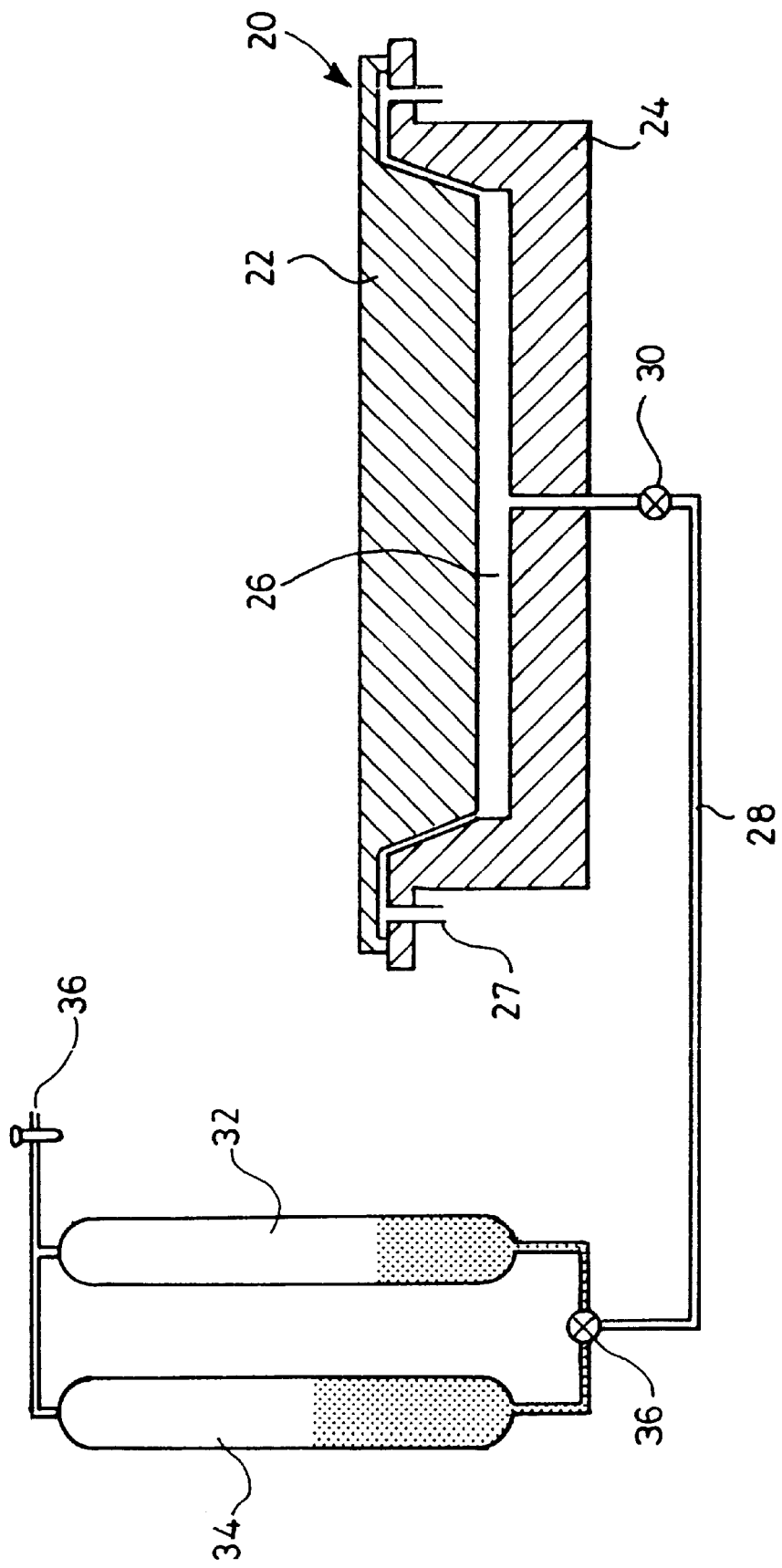
FIG. 3 is a schematic illustration of a first embodiment of apparatus in accordance with the present invention.

FIG. 3 shows the equipment used to achieve this cycle time reduction.

A mold 20 has an upper half 22, a lower half 24, and a cavity 26. A preform (not shown) is positioned in cavity 26. Resin is injected into the mold through an injection conduit 28. A resin inlet valve 30 is provided in the conduit 28.

Two parallel reservoirs 32 and 34 contain resin mixed with catalyst. In the reservoir 34 is located a hot curing resin system and in the reservoir 32 is located a cold curing resin system. A changeover valve 36 is operable to connect either the reservoir 34 or the reservoir 32 to the injection line 28. That one of the reservoirs 32, 34 which is connected to the injection line 28 is pressurized by supply pressure 36 which exerts pressure on the resin in the reservoir to force the resin out of the reservoir, along the injection line 28, through the valve 30 and into the mold cavity 26.

The mold cavity 26 is vented at 27.

In use, the changeover valve 36 is initially set to connect the hot curing system reservoir 34 to the injection line 28. The inlet valve 30 is then opened and the hot curing resin is injected into the mold cavity. The resin begins to flow out of the mold cavity, from the center towards the edges. Although a center pin gate is described here, the method of the invention can be used with a variety of different gate arrangements.

At a predetermined stage during the injection process, the changeover valve 36 is operated to disconnect the hot curing system reservoir 34 from the injection line 28 and to connect the cold curing system reservoir 32 to the injection line, so that the cold curing resin is forced into the injection line 28, following immediately behind the hot curing resin system. The changeover valve 36 will be constructed to ensure that no air or other extraneous matter is admitted when changeover takes place, and feed from the cold curing system will continue until the mold is completely full.

Because the cold curing resin will begin to cure as soon as it enters the mold (which will at this point be at a temperature of about 30° C.), the resin close to the injection gate will set only a short time after the resin at the mold periphery.

Figure 4:
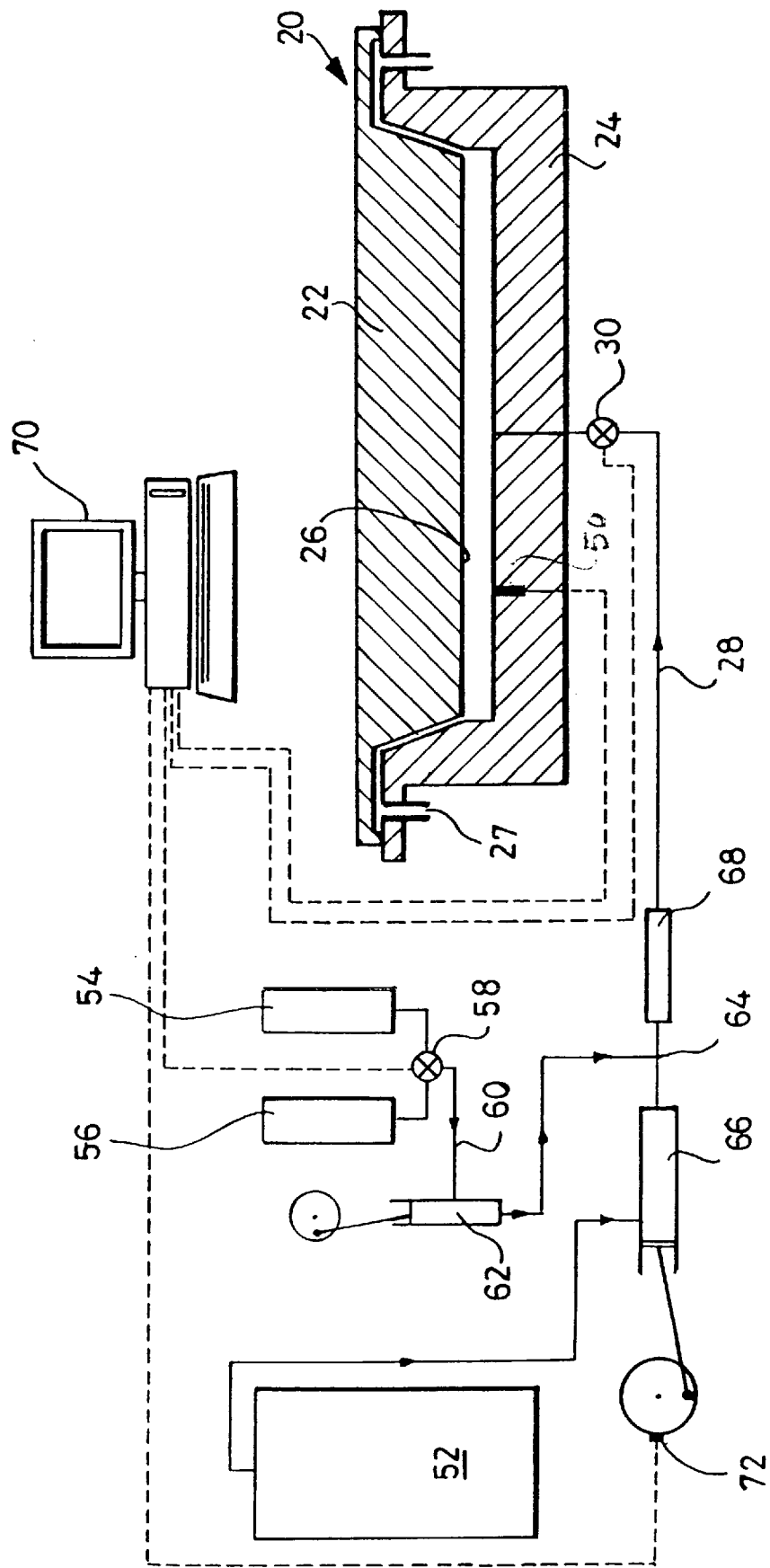
FIG. 4 is a schematic illustration of an alternative embodiment of apparatus in accordance with the present invention.

In an alternative arrangement shown in FIG. 4, there is only one resin reservoir. Two separate catalyst reservoirs are provided for admixture to the resin.

The mold 20 in FIG. 4 is the same as the mold 20 in FIG. 3. However, a different set of components is arranged externally of the mold. The mold also incorporates a resin arrival sensor 50.

In this embodiment there is a single resin reservoir 52, a hot curing catalyst reservoir 54 and a cold curing catalyst reservoir 56. A changeover valve 58 connects either one or the other of these two reservoirs via a line 60 to a pump 62 which then leads into the injection line 28 at 64.

A second pump 66 is used to pump resin from the reservoir 52 into the line 28, and the resin and the admixed catalyst then pass together through a static mixer 68 which ensures adequate mixing of the resin and catalyst before the resin system enters the mold cavity 26.

In this embodiment, operation is controlled by a computer 70 which receives inputs from the resin arrival sensor 50 and a pump counter 72 which monitors the resin pump 66. The computer 70 also controls operation of the changeover valve 58 and the inlet valve 30.

In use, with the pumps 62 and 66 operating and the changeover valve 58 set to allow flow of the high temperature catalyst from reservoir 54 into the line 60, a resin mixture with a hot curing catalyst is injected into the mold cavity 26.

When the resin arrival sensor detects the arrival of a resin front, indicating that the mold cavity 26 is partially filled, a signal is sent to the computer 70 which sends a signal to the changeover valve 58 to initiate a change from the reservoir 54 to the reservoir 56. Thereafter the pump 62 will be pumping the cold curing catalyst and a mixture of resin and cold curing catalyst will complete the filling of the mold.

Working in this way results in a thermal history of the type shown in FIG. 2, where the completion of cure of the cold curing system at the injection gate is completed at point 118, only a relatively short time after completion of the cure at the mold periphery at 114.

The embodiment of FIG. 4 is more suited to a continuous production process because the resin and catalysts are only mixed together immediately before being introduced into the mold cavity. In the embodiment of FIG. 3 when the resin and catalyst are pre-mixed, premixing is likely to take place in batches and each batch must be injected into a mold within a predetermined time after mixing of the batch, because the resin will only have a limited time before it will set.

What is claimed is:

1. A method of resin transfer molding using a mold having a periphery and an injection gate comprising the steps of:

injecting a first thermosetting resin system into a mold cavity to partially fill said mold cavity;

after said first resin system is injected, but before said first resin system has cured, injecting a second thermosetting resin system into said mold cavity, said first resin system curing at a higher temperature than said second resin system, said second resin system being injected behind said first resin system and causing said first resin system to flow to said mold periphery.

2. A method as claimed in claim 1, wherein said first resin system and said second resin system comprise the same resin but different catalysts.

3. The method of claim 1 wherein each subsequent injected resin system cures progressively faster than the previously injected resin system such that all resin systems cure at approximately the same point in time.

4. The method of claim 1 wherein said first resin system in the vicinity of said mold periphery and said second resin system in the vicinity of said injection gate cure at approximately the same point in time.

* * * * *